US010737201B2

(12) United States Patent
Roesgen et al.

(10) Patent No.: US 10,737,201 B2
(45) Date of Patent: Aug. 11, 2020

(54) FILTER SYSTEM AND FILTER ELEMENT

(71) Applicant: MANN+HUMMEL GmbH, Ludwigsburg (DE)

(72) Inventors: André Roesgen, Remshalden (DE); Petra Skorpíková, Olbramovice u Moravského Krumlova (CZ); Markus Nefzer, Ludwigsburg (DE); Fabian Wagner, Moeglingen (DE); Frank Pflueger, Sachsenheim (DE); Robert Hasenfratz, Schwaebisch-Hall (DE); Christian Thalmann, Speyer (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 420 days.

(21) Appl. No.: 15/833,407

(22) Filed: Dec. 6, 2017

(65) Prior Publication Data

US 2018/0161707 A1 Jun. 14, 2018

(30) Foreign Application Priority Data

Dec. 9, 2016 (DE) .................. 10 2016 014 635

(51) Int. Cl.
*B01D 35/30* (2006.01)
*B01D 29/96* (2006.01)
(Continued)

(52) U.S. Cl.
CPC ............ *B01D 29/96* (2013.01); *B01D 29/15* (2013.01); *B01D 35/30* (2013.01); *F01M 11/03* (2013.01);
(Continued)

(58) Field of Classification Search
CPC ........ B01D 29/96; B01D 29/15; B01D 35/30; B01D 2201/291; B01D 2201/305;
(Continued)

(56) References Cited

U.S. PATENT DOCUMENTS 6,251,273 B1 * 6/2001 Jawurek ................. B01D 29/21
210/232
6,607,665 B2 * 8/2003 Fick ....................... B01D 29/111
210/238

(Continued)

FOREIGN PATENT DOCUMENTS

DE 102014013818 A1 3/2016

*Primary Examiner* — Thomas M Lithgow
(74) *Attorney, Agent, or Firm* — James Hasselbeck

(57) ABSTRACT

A filter system (100) has at least one filter element (10), a filter housing (108) having at least one first housing part and one second housing part, in particular a lid (110), as well as a coupling device (50). The coupling device (50) thereby has at least one first coupling part (60) and at least one second coupling part (70) that corresponds to it for removable coupling of the at least one filter element (10) to the second housing part (110). The first coupling part (60) has one or a plurality of first latching means (62) and control surfaces (64). The second coupling part (70) has one or a plurality of second latching means (72) that can be brought into operative connection with the one or a plurality of first latching means (62) and control surfaces (64). At least the first and the second latching means (62, 72) can be brought into functional connection when joined, and the control surfaces (64) and the second latching means (72) can be brought into operative connection when first and second housing parts (110) are released. The second latching means (72) each have three bevels (76, 77, 79), at least two of which work together with the control surfaces (64) to release the second housing part (110) from the filter element (10) upon a relative rotation of the filter element (10) around the longitudinal axis (L) counter to the second housing part (110).

15 Claims, 10 Drawing Sheets

(51) Int. Cl.
*F16N 39/06* (2006.01)
*F01M 11/03* (2006.01)
*F02M 37/22* (2019.01)
*F02M 37/42* (2019.01)
*B01D 29/15* (2006.01)

(52) U.S. Cl.
CPC ............ *F02M 37/22* (2013.01); *F02M 37/42* (2019.01); *F16N 39/06* (2013.01); *B01D 2201/291* (2013.01); *B01D 2201/305* (2013.01); *B01D 2201/4015* (2013.01)

(58) Field of Classification Search
CPC . B01D 2201/4015; F16N 39/06; F01M 11/03; F02M 37/42
USPC .................................................. 210/232, 454
See application file for complete search history.

(56) References Cited

U.S. PATENT DOCUMENTS

| | | | |
|---|---|---|---|
| 6,627,078 B1 * | 9/2003 | Wagner | B01D 29/21 210/238 |
| 6,770,196 B2 * | 8/2004 | Wall | B01D 29/21 210/238 |
| 7,141,163 B2 | 11/2006 | Girondi | |
| 8,858,793 B2 | 10/2014 | Roesgen | |
| 2010/0219116 A1 | 9/2010 | Milum | |
| 2013/0098822 A1 | 4/2013 | Girondi | |

* cited by examiner

FILTER SYSTEM AND FILTER ELEMENT

TECHNICAL FIELD

The invention relates to a filter system for filtering a fluid, in particular for use as an oil or fuel filter of an internal combustion engine, as well as a replaceable filter element for use in a filter system of this type.

BACKGROUND

A filter system is known from DE 10 2010 020 727 B4 that includes a housing that comprises at least two housing parts and a filter element, which is mounted via a releasable latching connection in one of the housing parts that functions as a mounting housing part for the filter element. The latching connection thus has at least two cooperating latch components, wherein one of the latch components is connected to the filter element and one of the latch components is mounted on the mounting housing part and at least one of the latch components comprises at least one latching means and one of the latching components comprises a recess corresponding to the latching means, into which the latching means hooks in the manner of a bayonet closure. The recess has the following regions: a closure region for housing the latching means during the connection of the housing parts, a retaining region for housing the latching means during opening of the filter housing, a translational region for loosening the latching means in the recess and an insertion and removal region for resistance-free connection and separation of latching means and recess.

A filter device is further known from DE 602 02 365 T2, whose filter element has a coupling device on one end plate that has an engagement contour beveled in the radial direction, behind which a housing-side snap hook can be snapped. Below the engagement contour, a ramp is provided that extends in a circumferential direction and whose radial distance from the central longitudinal axis increases in the circumferential direction moving out from the engagement contour. Via this ramp, a release of the snap hook from the engagement contour in the radial direction can be effected by means of a relative rotation of filter element and housing part.

The filter element has a latching component that is adapted to form a releasable latch connection to a latching component that is connected to a mounting housing part of a filter housing. One of the latching components thus comprises at least one latching means, and one of the latching components comprises a recess corresponding to the latching means, into which the latching means hooks in the manner of a bayonet closure.

The latching connection is activated and deactivated by means of a switching device having a switching link. For the removal of the filter, the filter element is inserted into the mounting housing part. By virtue of a first, pulse-like axial movement of the filter element, a switching lug is turned from the insertion and removal region into the closure region with the switching device. For removal, the mounting housing part having the filter element is separated from the housing part fixed in the system. The latching means is thus rotated automatically across the translational region into the retaining region of the housing so that the filter element is held in the mounting housing part.

SUMMARY OF THE INVENTION

It is therefore one object of the invention to create a filter system for the use of a filter element that allows the filter element to be inserted into a filter housing in a simple and ergonomic manner and then removed again without additional equipment.

It is therefore a further object of the invention to create a filter element which allows the filter element to be inserted into a filter housing in a simple and ergonomic manner and then removed again without additional equipment.

The aforementioned objects are achieved according to one aspect of the invention by a filter system, at least one filter element, a filter housing having a second housing part, in particular a lid, and comprising a coupling device, wherein the coupling device comprises at least a first coupling part and at least a second coupling part corresponding to it for releasable coupling of the at least one filter element to the second housing part.

Favorable embodiments and advantages of the invention are disclosed in the further claims, the description and the drawings.

A filter system for filtering a fluid is proposed that comprises at least one filter element, a filter housing having a second housing part, as well as a coupling device, wherein the coupling device comprises at least one first coupling part and at least one second housing part corresponding to it for releasable coupling of the at least one filter element to the second housing part. The first coupling part thus has one or a plurality of first latching means and control surfaces. The second coupling part comprises one or a plurality of second latching means that can be brought into operative connection with the one or the plurality of first latching means and control surfaces. At least the first and the second latching means can thus be brought into a functional connection when joined and the control surfaces and the second latching means can be brought into operative connection when the second housing part and filter element are released.

The filter system according to the invention has a coupling device that allows the second housing part, in particular a lid, of the filter housing to be pushed over the filter element and latched in a neutral position along a longitudinal axis. The second housing part is in this state coupled in a fixed manner to the end plate of the filter element and thus to the filter element itself, so that the filter element can be lifted with the second housing part and inserted into the filter housing. In a removal position, the filter element, for example for maintenance purposes, can be removed together with the second housing part, in particular a lid, out of the filter housing so that, by lifting the second housing part from the filter housing, the filter element can be removed from its mounting in the filter housing. By means of a relative rotational movement of second housing part and filter element counter to each other, the second housing part and the filter element can be separated from each other again, so that the filter element can be replaced and a new filter element can be connected to the second housing part and inserted into the first housing part.

The coupling device is designed so that latching means of a first coupling part can cooperate with latching means of a second coupling part, wherein the first coupling part, for example, can be arranged on the second housing part and the second coupling part can be arranged on the filter element. Thus, for example, one or a plurality of latching lugs of the second latching means can engage into the first latching means and latch into openings, for example, that are attached to the first latching means. The coupling device is designed in such a manner that it can accommodate the forces for a removal of the filter element from its mounting with a possible opening of a drain channel for draining the fluid still contained in the filter system. In upright filter systems, it is ensured in this manner that raw fluids cannot pass into the clean side of the filter system when the filter element is removed and, thus, possibly into the internal combustion engine. In the case of large filter elements—for example, for commercial vehicle applications—the forces necessary for this can easily be several hundred N.

The advantage of the filter system according to the invention is in particular that the release of the second housing part from the filter element can be done merely by axial rotational movements of the second housing part counter to the filter element, while the coupling elements necessary for this can be designed in a radial arrangement on coaxial circles. Latching means that have an undercut are advantageous for opening a outlet of the filter system for the removal of the filter element. Undercuts in the corresponding coupling part for a control surface are also advantageous for releasing the second housing part from the filter element by guiding the latching means on a control surface.

It is also advantageous if the second housing part can be removed from the filter element in at least a neutral position of the coupling device. If the filter element is pulled out with the second housing part in the disassembly position, the second housing part can conveniently be pulled off by rotation around the longitudinal axis into a neutral position of the coupling device. Likewise, it can also be placed in the corresponding neutral position for a mounting of the filter element by pushing in the axial direction in order to then install the replaced filter element with the second housing part.

In one advantageous embodiment, the first and the second latching means can be designed so that the second latching means can be latched to the first latching means by a relative axial movement of second housing part and filter element in mounting direction. In this latching for the purpose of mounting the filter element in the second housing part, in particular lid, a latching deformation of the second latching means in the radial direction is achieved by cooperation of the axial bevels of the second latching means with the control surfaces of the first latching means, which first enables the aforementioned latching. Such a mounting by simple pushing of the second housing part onto the filter element with resultant latching of the two latching means represents a safe and practicable solution for connecting the filter element to the second housing part in a fixed manner so that the filter element is handled by means of the second housing part and, for example, installed in the housing of the filter system or again removed from it.

In a further advantageous embodiment, the one or plurality of control surfaces can be designed so that, by a relative rotation around a longitudinal axis of second housing part and filter element, the second latching means can be moved along the control surfaces in the radial and/or axial direction. In this manner, the filter element is firmly connected to the second housing part and easily manageable if pulled against the second housing part in the axial direction; however, the second housing part, on the other hand, can also be released, in turn, if the control surface, by relative rotation around the longitudinal axis of second housing part counter to the filter element, moves the second latching means and is released from its engagement. The second latching means can thereby cooperate with one bevel of the control surface via a bevel that is accommodated on the second latching means in such a manner that the second latching means is displaced in the radial direction and can thereby be released from the engagement.

Advantageously, the first coupling part can be on the second housing part and the second coupling part on the filter element. In this embodiment, the advantage is in that the first coupling part is arranged with corresponding control surfaces in the second housing part where it is more beneficial to constructively accommodate control surfaces in undercuts. The second coupling part can thus be conveniently arranged with latching means in the form of snap or latch elements on an end plate of the filter element.

Alternatively to this, an arrangement of the first coupling part on the filter element and of the second coupling part on the second housing part is also possible. In the case of a thicker end plate, it is also conceivable to accommodate the first coupling part having control surfaces in the end plate, into which corresponding latching means of a second coupling part can be engaged and latched.

In one advantageous embodiment, the coupling device can be arranged on the outside of regions of the second housing part having clamping points. As a result, the load distribution that acts on the second housing part is favorably distributed so that the danger of material fatigue and possible rupture of the material can be reduced by such a configuration of the arrangement of the coupling device.

In a further advantageous embodiment, the second latching means can comprise latching lugs. Latching lugs are simple latching means that can latch securely into undercuts or openings and can thus guarantee a secure connection of second housing part and filter element. Furthermore, it is helpful to produce latching lugs, so that they are shown to be secure with their undercuts. Alternatively or additionally, the second latching means can extend axially away from one end plate of the filter element to at least one periphery.

In an additional advantageous embodiment, the control surfaces can comprise at least one axially oriented bevel and one tangentially oriented bevel. Such a tangentially oriented bevel on one control surface can beneficially cooperate with a second latching means in such a way that the second latching means is displaced in the radial direction and can thereby release from the engagement. In this manner, by a relative rotation of second housing part counter to the filter element, the control surfaces can move the second latching means and release it from its engagement. Such an axially oriented bevel can thus beneficially engage with the second latching means so that the second latching means is displaced in the axial direction and the lid can thus be released from the filter element.

Advantageously, the axial bevels pointing in radial direction, the lateral axial bevels and the tangential bevels are located in a common corner region of the second latching means that is formed as a complex corner region having the three functional bevels.

According to the invention, the second latching means each comprise three bevels, wherein at least two of the bevels cooperate with the control surfaces to release the second housing part from the filter element upon a rotation around the longitudinal axis of the second housing part counter to the filter element. Such a bevel on a second latching means can beneficially cooperate with a bevel that is arranged on one control surface so that the second latching means is displaced in the radial direction and can thereby release from the engagement. In this manner, the control surface, by a relative rotation around the longitudinal axis of second housing part counter to the filter element, can move the second latching means and release it from its engagement.

According to the invention, the second latching means comprise at least one axially oriented axial bevel pointing in radial direction, one axially oriented lateral axial bevel pointing in circumferential direction and one tangentially oriented tangential bevel. It is thus possible that the bevels of the second latching means can cooperate beneficially with the control surfaces of the first latching means in order to engage the second latching means or to release and axially displace it, so that lid and filter element can be appropriately joined and released from one another.

Through the cooperation of the bevels with the corresponding control surfaces of the first coupling part, by a relative rotation of the filter element around the longitudinal axis counter to the second housing part by the tangential bevels, a disengaging deformation of the latching means in the radial direction and, by means of the cooperation of the lateral axial bevels with the control surfaces, a release movement in the axial direction can be achieved.

The deformation of the second latching means in the radial direction for releasing effected by the tangential bevels should in this context be at least large enough that it can become disengaged from the latching engagement with the first latching means. In order to prevent high extraction forces of the filter element out of the second housing part, in particular lid, the tangential bevels are provided that produce an extraction movement just in the axial direction. To a certain extent, an integrated filter element removal device is created by the cooperation of the tangential bevels with the corresponding control surfaces, which significantly facilitates the removal, in particular in the case of soiling and/or signs of aging.

This functionality is especially important if, when a service drain provided in a housing part (e.g. housing pot) is opened via the filter element in the event of service, the fluid contained in the housing is conducted back into, for example, a tank and/or oil pan when the filter element is removed. Depending upon the sealing concept of this servicing event, in particular in the case of radial seal concepts, high extraction forces sometimes arise that are caused by, among other things, sources of elastomer sealing components and aging as well as soiling. These extraction forces must now be transmitted from the housing part, usually the lid, via the filter element down to the closure element of the service outlet. Because, as indicated above, such extraction forces sometimes amount to a several hundred N, a connection of the filter element to the lid must always withstand the forces occurring, that is, a latching connection must be designed sufficiently rigid; this, however, makes it difficult, on the other hand, to again release the latching connection unaided. At this point, the solution according to the invention is implemented by the removal of a filter element with a very rigid latching connection from the lid being substantially simplified.

As already described herein, the axial bevels having a radial orientation are, by contrast, primarily functionally relevant when the filter element latches with the second housing part, in particular lid.

Especially advantageously, this is possible if the axially oriented axial bevel pointing in radial direction and the axially oriented lateral axial bevel pointing in circumferential direction are inclined at an angle of at least 90 degrees to one another.

In an additional advantageous embodiment, the first latching means can comprise openings and/or recesses. The second latching means, which are formed as latching lugs, for example, can thus engage into these openings and/or recesses and thus effect an engagement of second housing part and filter element. Such an engagement is especially advantageous in an operating position, because in this manner an inadvertent removal of the second housing part can be prevented. Only by overcoming a certain resistance can the coupling device be opened and the second housing part removed from the filter element.

In an additional advantageous embodiment, the first coupling part can be formed as a sleeve-shaped section, in whose wall the first latching means are arranged. Such a sleeve-shaped section is especially advantageous as a coupling part because the distribution of force and introduction of the forces into the second housing part can be advantageously designed. A sleeve-shaped section is also very advantageous in handling the second housing part, specifically a lid, because it can be designed to be robust, so that inadvertent damages can also be prevented. The sleeve-shaped section can be pushed securely over the second coupling part and thus latched to the first coupling part, wherein openings for engaging the second latching means can be advantageously arranged in the sleeve-shaped section. The openings can be designed as windows penetrating the wall of the sleeve-shaped section or as recesses that do not penetrate the wall of the sleeve-shaped section. The shape of the sleeve-shaped section having the openings can also be described as a crown. The sleeve-shaped section is arranged approximately on the lid and extends in an installed state in longitudinal direction to the filter element direction.

In an additional advantageous embodiment, the filter element can be installed and extracted with the second housing part along the longitudinal axis when the latching means are engaged. In a removal position, the filter element—for maintenance purposes, for example—can be removed from the filter housing so that, by lifting the second housing part, in particular the lid, from the filter housing, the filter element can be removed from its mounting in the filter housing. The coupling device is designed in such a manner that it can accommodate the forces for a removal of the filter element from its mounting with a possible opening of a drain channel for draining the fluid still contained in the filter system. In upright filter systems, it is ensured in this manner that raw fluids cannot pass into the clean side of the filter system when the filter element is removed and, thus, possibly into the internal combustion engine.

In an advantageous embodiment, the second coupling element can be arranged in the radial direction within the first coupling element. Likewise, it is however possible that the second coupling element is arranged in the radial direction outside the first coupling element. Correspondingly, the latching lugs can be arranged radially oriented to the outside or radially oriented to the inside.

In one advantageous embodiment, the filter system can be used as an oil filter or fuel filter, in particular as an oil filter or fuel filter of an internal combustion engine.

According to a further aspect, the invention relates to a filter element for installation in a filter system according to the invention that has at least one end disk with a sealing device arranged on an end face of a filter bellows having a coupling part, which is provided for cooperation with a corresponding coupling part of a coupling device. The coupling device thus allows the second housing part of the filter housing to be pushed in a neutral position along a longitudinal axis over the filter element and engaged. The second housing part of the filter element is in this state coupled in a fixed manner to the end plate of the filter element and thus to the filter element itself, so that the filter element can be lifted with the second housing part and inserted into the filter housing. In a removal position, the filter element—for maintenance purposes, for example—can be removed from the filter housing so that, by lifting the second housing part from the filter housing, the filter element can be removed from its mounting in the filter housing.

By means of a relative rotational movement of second housing part and filter element counter to each other, the second housing part and the filter element can again be separated from each other.

For this purpose, the coupling part of the filter element comprises one or a plurality of latching means. The latching means each comprise bevels that are designed to effect a release of the housing part from the filter element when there is a relative rotation of the filter element around its longitudinal axis counter to a housing part. The bevels are at least one axially oriented axial bevel pointing in radial direction, one axially oriented lateral axial bevel pointing in circumferential direction and one tangentially oriented tangential bevel. Via the tangential bevels during the aforementioned relative rotation, a disengaging deformation of the latching means in the radial direction can first be effected and via the lateral axial bevels an extraction movement in the axial direction can be effected.

BRIEF DESCRIPTION OF THE DRAWINGS

Further advantages arise from the following drawing description. The drawings show exemplary embodiments of the invention. The drawings, the description and the claims contain numerous features in combination. The person skilled in the art will expediently consider the features individually and combine them into meaningful further combinations. Shown in the drawings, by way of example are:

DETAILED DESCRIPTION

Figure 1:
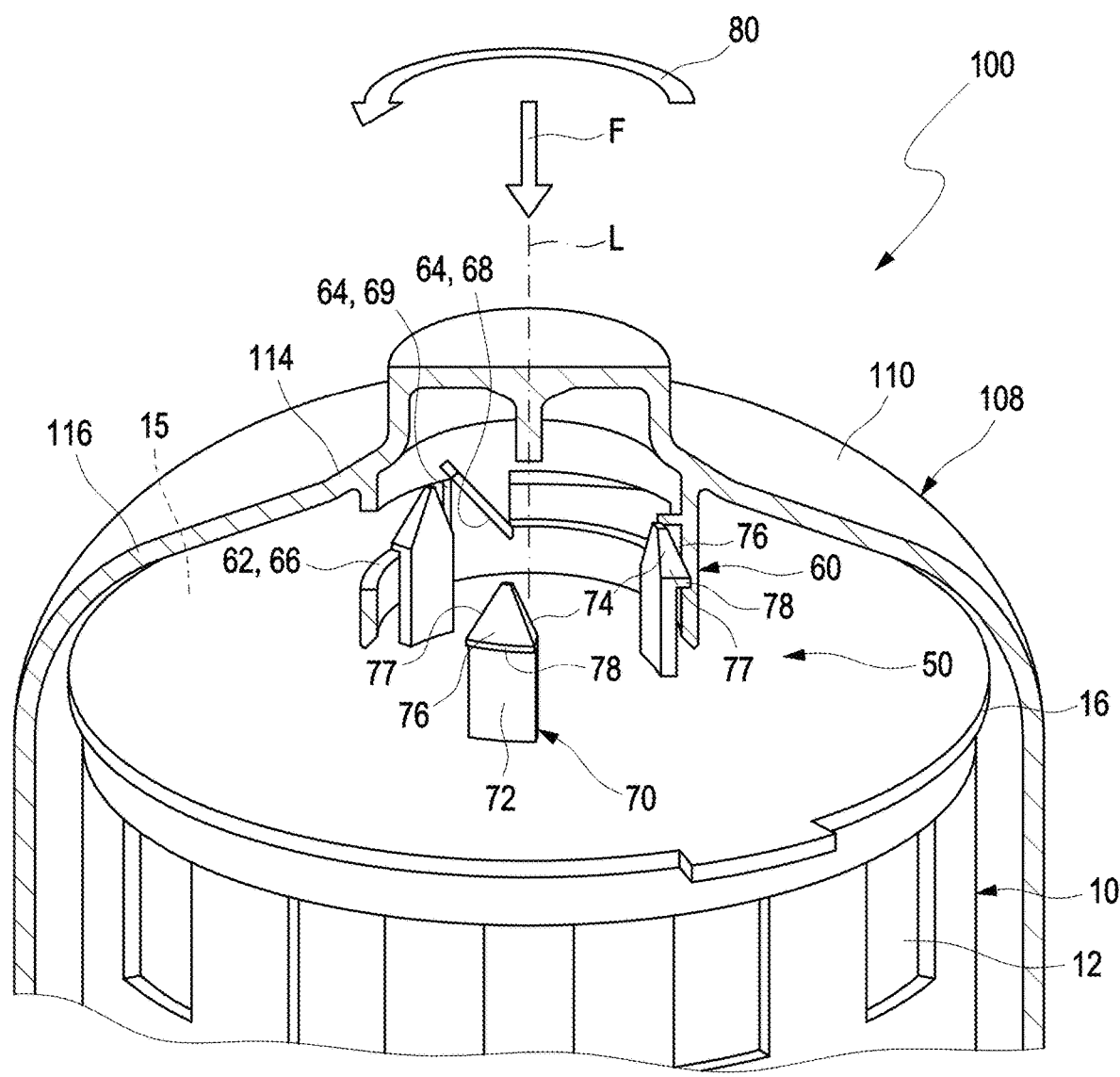
FIG. 1 an isometric, cutaway sectional view of a filter system according to an exemplary embodiment of the invention, which shows the coupling device.

The same or similar components in the figures are referenced with same reference characters. The figures merely show examples and are not intended to be restrictive.

In FIG. 1, an isometric, partial sectional view of a filter system 100 for filtering a fluid according to an exemplary embodiment of the invention can be seen that is used as oil filter or fuel filter, in particular as oil filter or fuel filter of an internal combustion engine. In FIG. 1, the coupling device 50 is shown in detail. The illustration shows a filter housing 108 having a first housing part (not depicted) and a second housing part 110, wherein the second housing part 110 is designed to be removed from the first housing part. A filter element 10 is arranged in the filter housing 110. The second housing part 110 is configured below as lid 110, for example. The filter housing 108 having the lid 110 is half cut open so that the filter element 10 arranged in the interior of the filter housing 108 can be seen in its normal intended arrangement. The filter system 100 comprises a coupling device 50 that has a first coupling part 60 and a second coupling 70 that corresponds to it for removable coupling of the one filter element 10 to the lid 110.

The first coupling part 60 has a plurality of first latching means 62 and control surfaces 64. The second coupling part 70 has a plurality of second latching means 72 that can be brought into operative connection with the first latching means 62 and control surfaces 64. The first and second latching means 62, 72 can be brought into operative connection during assembly, while the control surfaces 64 and the second latching means 72 can be brought into operative connection when the lid 110 is released from the filter element 10. The first and the second latching means 62, 72 are designed so that by a relative axial movement of lid 110 and filter element 10, the second latching means 72 can be engaged with the first latching means 62. The lid 110 can be pushed onto the filter element 10 in axial direction L for this purpose. This is indicated by the arrow F pointing down in the figure. When latching means 62, 72 are engaged, the filter element 10 can thus be inserted with the lid 110 along longitudinal axis L into the first housing part of the filter housing 108 and—when the filter system 100 undergoes maintenance, for example—also be extracted.

The first coupling part 60 in the exemplary embodiment illustrated in FIG. 1 is attached on lid 110 and the second coupling part 70 on the filter element 10, namely on the end plate 16, which attaches to the filter bellows 12 axially at the end face 15. Alternatively to this, however, the first coupling part 60 can also be arranged on the filter element 10 and the second coupling part 70 on the lid 110. The first coupling part 60 in the exemplary embodiment is designed as a sleeve-shaped section in whose wall are arranged the first latching means 62, openings 66 in the example shown. The second latching means 72 are formed as latching lugs 74 that can snap into and engage in the openings 66 of the first latching means 62 of the first coupling part 60 when the lid 110 is pushed onto the filter element 10.

To release the engaged lid 110 from the filter element 10, a relative rotation around the longitudinal axis L of the lid 110 counter to the filter element 10 is performed, wherein in the figure the lid 110 is moved counterclockwise 80 relative to the filter element. The control surfaces 64 are formed in such a way that, by the relative rotation of lid 110 and filter element 10, the second latching means 72 can be moved inward along the control surfaces 64 in the radial direction. For this purpose, the control surfaces 64 comprise bevels 69 and the second latching means 72 comprise projections 78 oriented radially outward. The bevels 69 are tangentially designed, meaning the left and right boundaries of the bevels 69 are not aligned in a radial direction, but the bevels 69 run obliquely between two radial directions and thus point in the direction of the second latching means 72.

The second latching means 72 further comprise bevels 77, that are arranged laterally on the second latching means 72 and that, when there is an additional relative rotation of lid 110 counter to the filter element 10, engage with the bevels 68 of the control surfaces 64 for the release of the lid 110 from the filter element 10 in the axial direction along a longitudinal axis L.

During the relative rotation around the longitudinal axis L of the lid 110 counter to the filter element 10, the latching lugs 74 of the latching means 72 thus slide with their projections 78 on the tangential bevels 69. In this manner, the latching means 72 are pressed radially inward by the tangential bevels 69 and thus released from their engagement with the openings 66 of the first latching means 62. This allows the lateral axial bevels 77 of the second latching means 72 to come into contact with the radially inward-reaching bevels 68 of the control surfaces 64. The bevels 68 of the control surface 64 then press the latching means 72 downward in arrow direction F when the rotation is continued. The lid 110 is thus released from the filter element 10 and can be extracted against the axial direction along the longitudinal axis L.

In the exemplary embodiment illustrated in FIG. 1, the second coupling element 70 is arranged in the radial direction within the first coupling element 60. Likewise, it is nevertheless possible that the second coupling element 70 is arranged in the radial direction outside the first coupling element 60.

Expediently, the coupling device 50 is arranged outside of regions 114, 116 with mechanical clamping points of the lid 110. The load distribution that acts on the lid 110 is thereby favorably distributed so that the danger of material fatigue and possible rupture of the material can be reduced by such a configuration of the arrangement of the coupling device 50.

Figure 2:
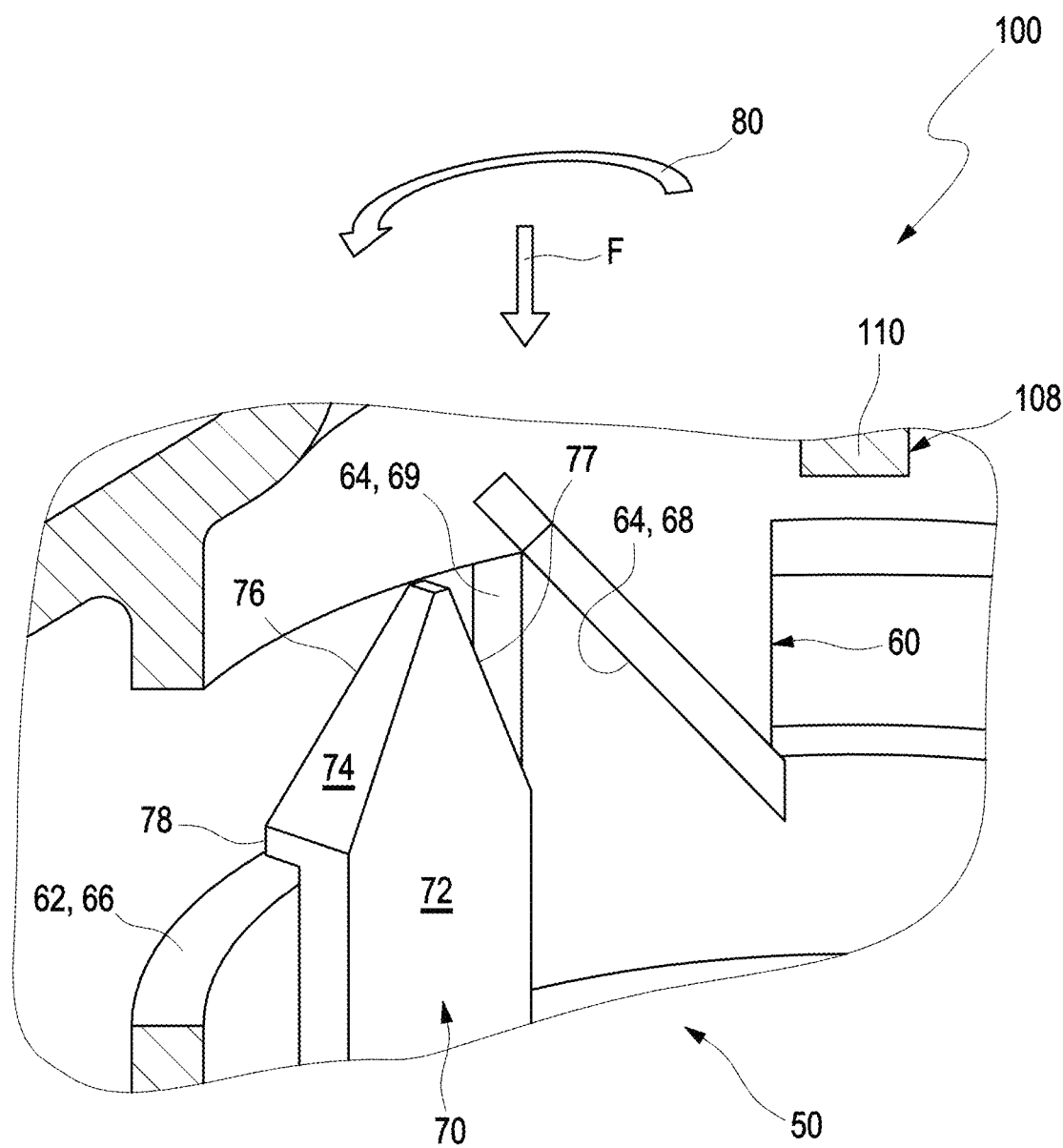
FIG. 2 an isometric view of the coupling device according to the exemplary embodiment of the invention in FIG. 1.

FIG. 2 shows in detail an isometric view of the coupling device 50 according to the exemplary embodiment of the invention from FIG. 1. In this arrangement, the first and second coupling parts 60, 70 and their cooperation with each other can be recognized more clearly. The first coupling part 60 arranged on the lid 110 is designed as sleeve-shaped section that is on the inner side of the lid 110, advantageously integrally connected, especially advantageously injection molded or cast with the lid 110. The sleeve-shaped section has slot-like openings 66 as first latching means 62. The second coupling part 70 arranged on the end plate 16 comprises second latching means 72 with latching lugs 74, which slide over the edge of openings 66 when the lid 110 is pushed on in the axial direction L and then engage in the openings 66 so that the lid 110 is firmly connected to the filter element 10. In this state, the filter element 10, together with the lid 110 can be inserted in a housing and extracted from it.

The sleeve-shaped section as first coupling part 60 has control surfaces 64 with bevels 68 and 69 on its interior. The latching lugs 74 of the second latching means 72 have radially outwardly pointing projections 78 and also bevels 77 that are laterally provided on the latching lugs 74. By the relative rotation of the lid 110 counter to the filter element 10 around the longitudinal axis L, the control surface 64 slides with its tangentially formed lateral bevels 69 against the radially outward-projecting projections 78 of the second latching means 72 and presses these inward in the radial direction out of the opening 66, whereby the engagement of latching lug 74 is released from the opening 66. The bevels 68 in circumferential direction 80 press on the lateral axial bevels 77 of the latching lug 74 when there is a further rotation and thus force the latching lugs 74 and with them the filter element 10 axially downward in arrow direction F. Consequently, the lid 110 again releases from the filter element 10 and can be extracted against the arrow direction F in axial direction L from the filter element 10.

An additional exemplary embodiment of a filter system 100 according to the invention is illustrated in the following FIGS. 3 to 15.

Figure 3:
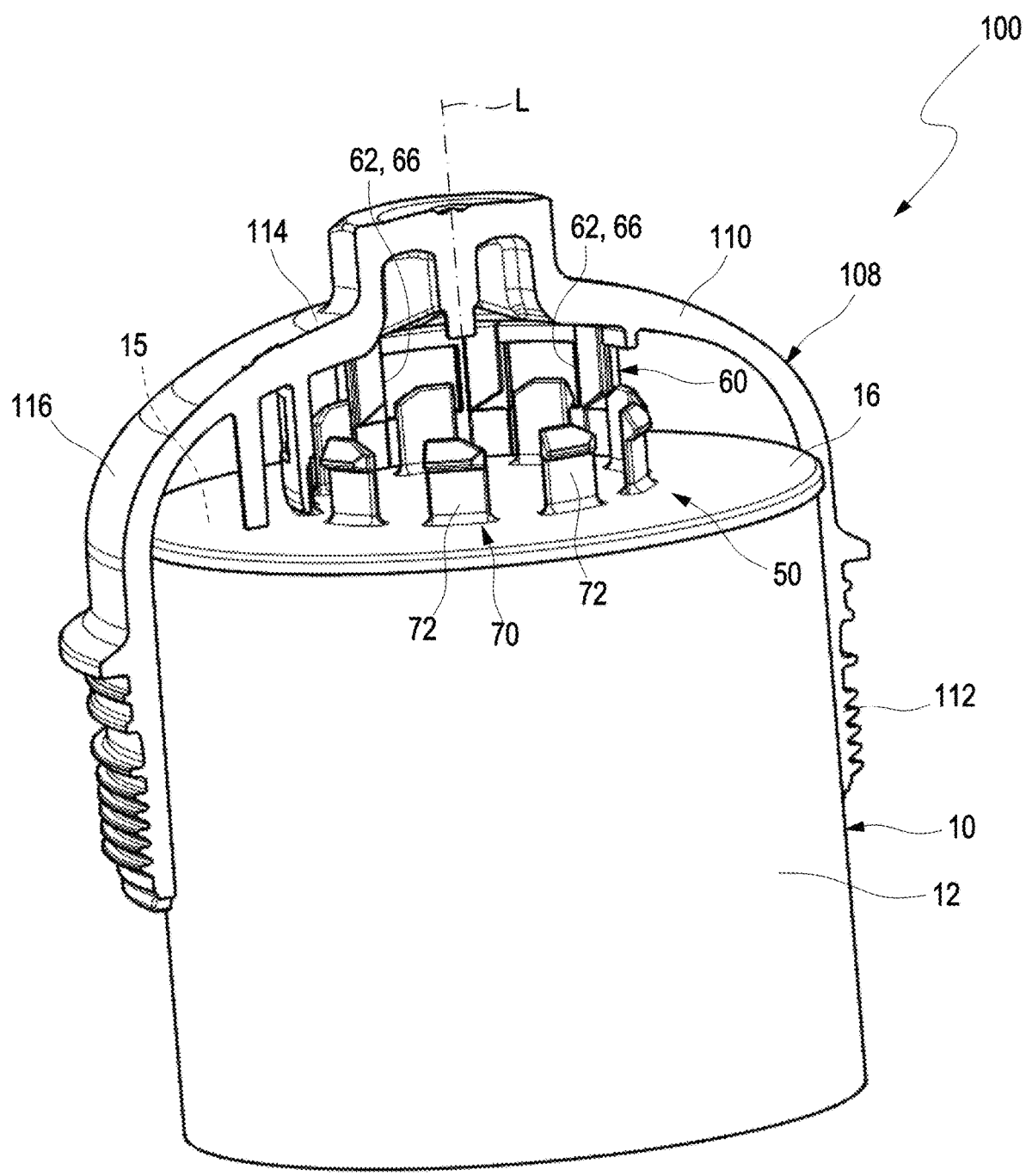
FIG. 3 an isometric, partial sectional view of a filter system according to an exemplary embodiment of the invention, which shows a coupling device having a first and a second coupling part and in which a filter element is fixed in a housing lid.

In FIG. 3, an isometric, partial sectional view of the filter system 100 for filtering a fluid can be seen that is used as oil filter or fuel filter, in particular as oil filter or fuel filter of an internal combustion engine.

The illustration shows a filter housing 108 having a first housing part (not depicted) and a second housing part 110, wherein the second housing part 110 is designed to be removed from the first housing part. A filter element 10 is arranged in the filter housing 110.

The second housing part 110 can be connected to the first by means of a screw thread 112. The second housing part 110 is configured below as lid 110, for example. The filter housing 108 having the lid 110 is illustrated half cut away so that the filter element 10 arranged in the interior of the filter housing 108 can be seen in its intended arrangement.

The filter system 100 comprises a coupling device 50 that has at least one first coupling part 60 and at least one second coupling part 70 that corresponds to it for removable coupling of the filter element 10 to the lid 110. The first coupling part 60 is thus arranged in the shape of a sleeve-shaped section on the interior of the lid 110, while the second coupling part 70 is arranged on the end plate 16 of the filter element 10 inside a periphery of the first coupling part 60. The sleeve-shaped section of the first coupling part 60 has openings 66 for housing the first latching means 72 of the second coupling part 70 that cooperate with the first latching means 62 of the first coupling part.

FIG. 3 shows the filter element 10 in a state of being mounted on the lid 110, wherein the second coupling part 70 is engaged in the openings 66 of the first latching means 62 of the first coupling part 60. In this state, the filter element 10 can be inserted with the lid 110, for example into a first housing part of the filter system 100, or else extracted.

Also in this exemplary embodiment, the coupling device 50 is arranged outside of regions 114, 116 with mechanical clamping points of the lid 110. The load distribution that acts on the lid 110 is thereby favorably distributed so that the danger of material fatigue and possible rupture of the material, in particular through the effect of pressure pulsations can be reduced by such a design of the arrangement of the coupling device 50.

Figure 4:
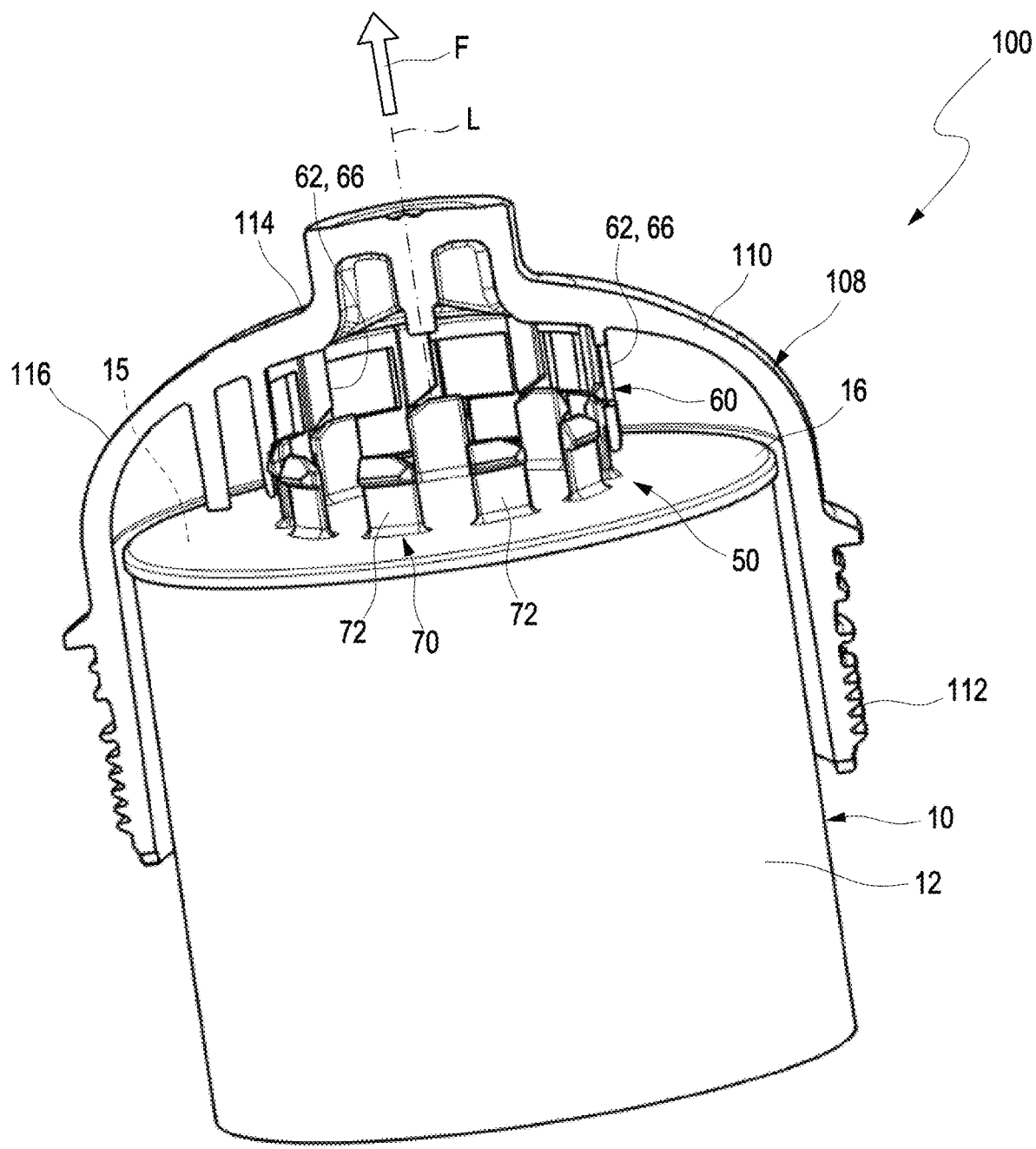
FIG. 4 the filter system from FIG. 3 upon release of the lid from the filter element.
Figure 14:
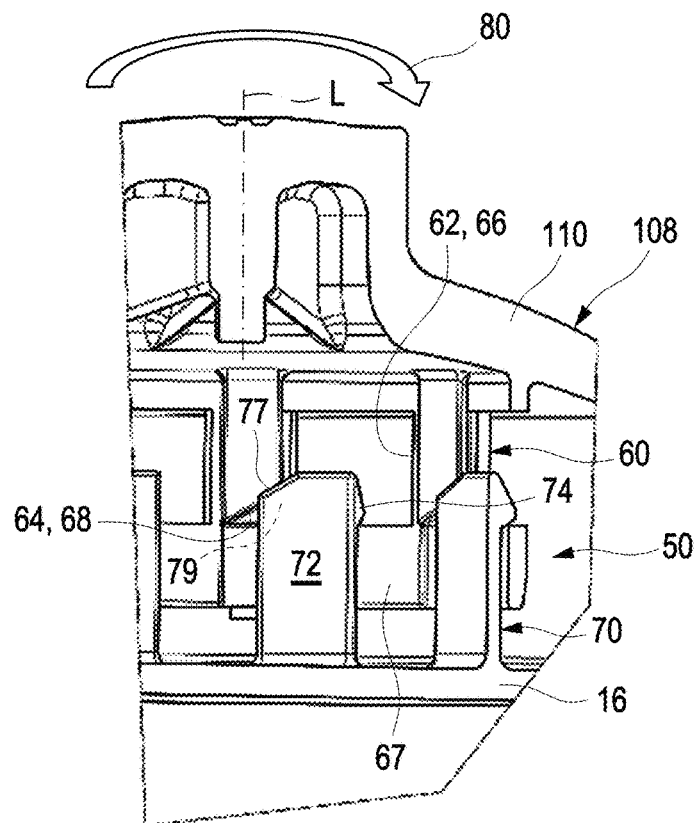
FIG. 14 a section of an isometric, partial sectional view of the coupling device of the filter system according to FIG. 3 upon release of the lid from the filter element after dismantling from the housing.
Figure 15:
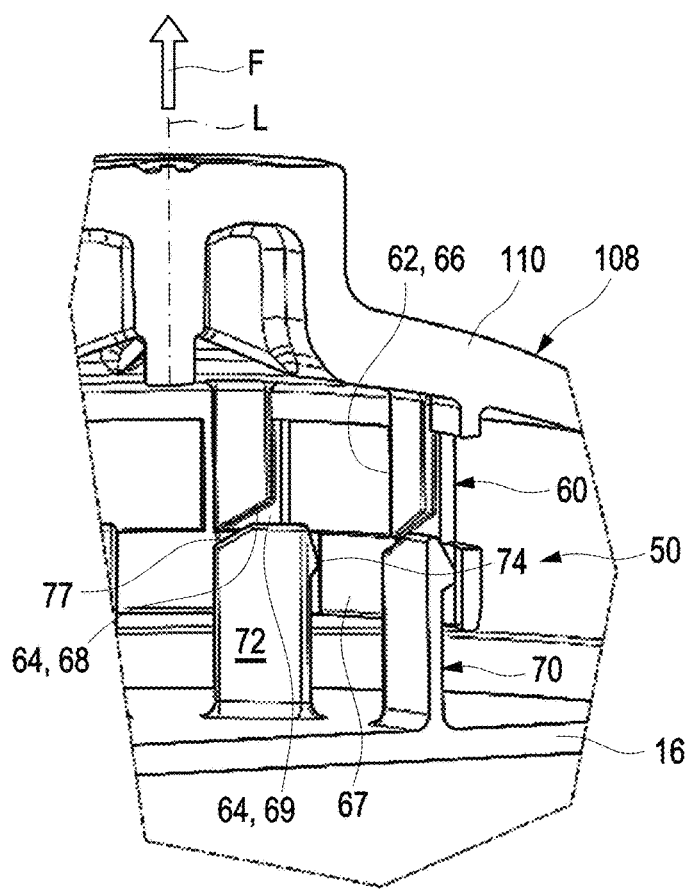
FIG. 15 the coupling device according to FIG. 14 when the lid is removed from the filter element.

In FIG. 4, the filter system 100 from FIG. 3 is shown when the lid 110 is released from the filter element 10. The second coupling part 70 is thus released from the openings 66 of the first latching means 62 of the first coupling part 60 so that the lid 110 can be extracted from the filter element 10, which is indicated by the arrow F in FIG. 4. Details of the dismantling of filter element 10 from the lid 110 are illustrated in FIGS. 14 and 15.

Figure 5:
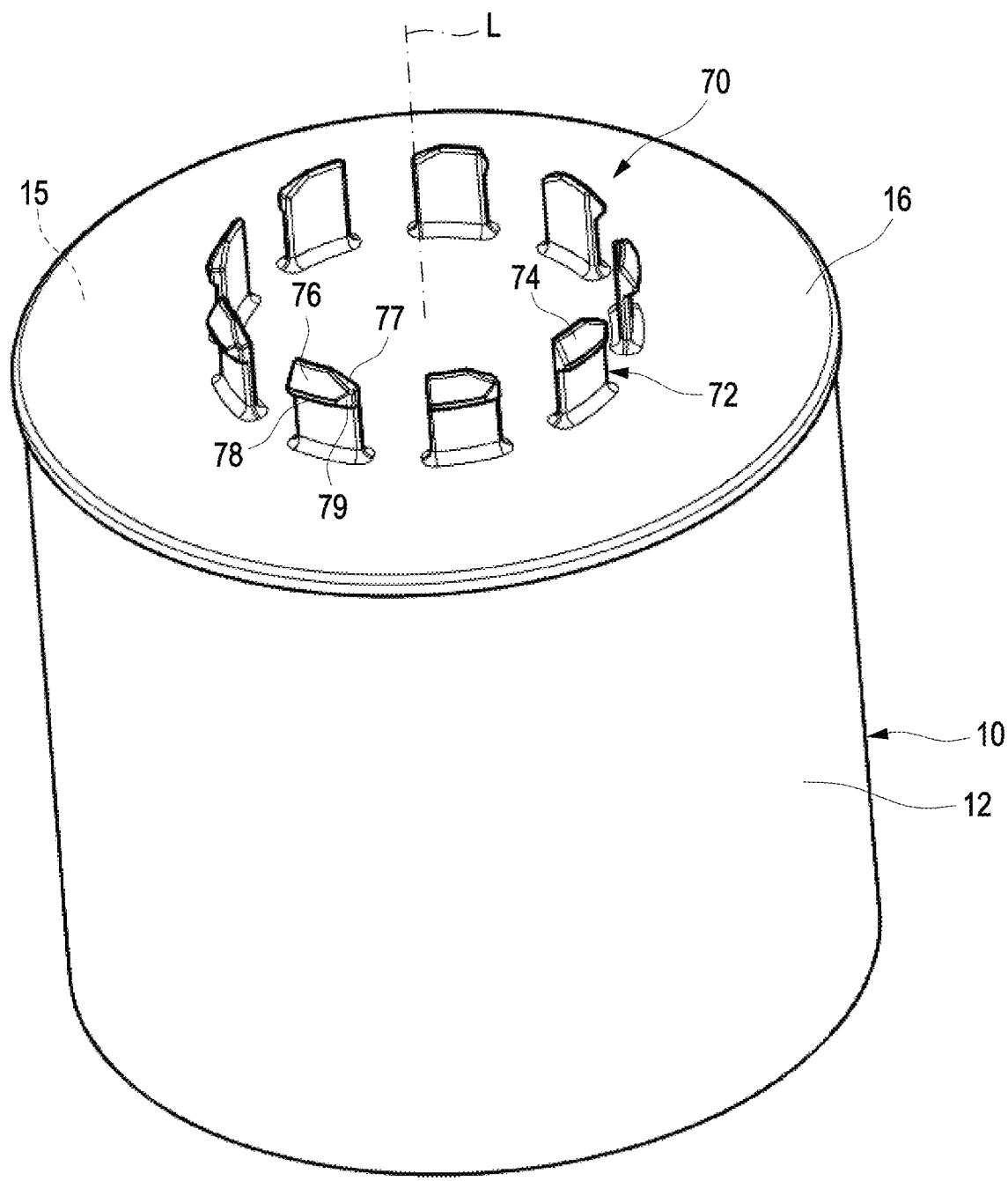
FIG. 5 an isometric view of the filter element from FIG. 3 with second coupling parts.

FIG. 5 shows an isometric illustration of the filter element 10 according to FIG. 3 that shows the second coupling part 70. The second latching means 72 of the second coupling part 70 in the form of latching means 72 are arranged centrally on a circle on the end plate 16 of filter element 10. The second latching means in the embodiment shown are distributed over the periphery at regular angular intervals. In one embodiment not figuratively shown, a different number of latching means can also be provided.

Figure 6:
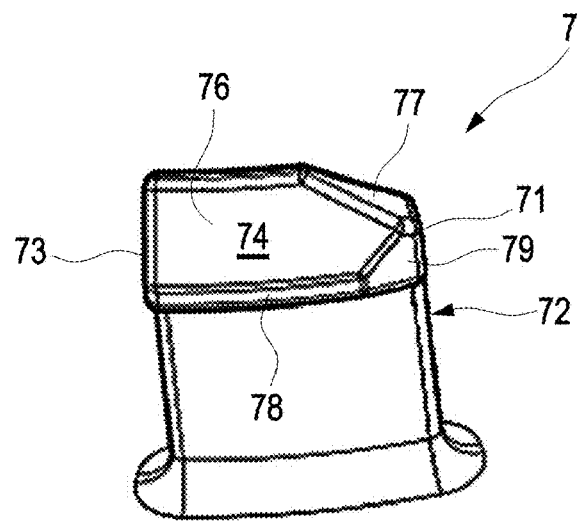
FIG. 6 an isometric view of an isolated second coupling part of the filter element from FIG. 5.

FIG. 6 shows details of a second latching means 72 of the second coupling part 70 of the filter element 10 from FIG. 5. The latching means 72 of the second coupling part 70 are formed by latching lugs 74, on which a plurality of control faces are provided. The latching lug 74 has a predetermined width in peripheral direction and a predetermined height in element longitudinal direction. The latching means 72 are arranged in the array on the circular ring, as illustrated in FIG. 5. They have first axial bevels 76 running inclined in the axial direction against longitudinal direction L that are inclined inward in the radial direction or around a tangent on the circular ring. The projections 78 of the first axial bevels 76 preferably follow the periphery of the circular ring. The respective projection 78 serves to engage in the opening 66 of a first latching means 62 of a first coupling part 60.

Latching means 72 further have on one side a lateral axial bevel 77 running inclined in a radial direction. One can also describe these as chamfering of a side edge of an intended end face of the latching lug 74. The lateral axial bevel 77 borders the first axial bevel 76. The lateral axial bevel 77 preferably forms at least a right angle with respect to the first axial bevel 76.

Furthermore, the latching means 72 each comprise a tangentially outward bevel 79 arranged oblique to the two axial bevels 76, 77 that borders the two axial bevels 76 and 77.

The spatial location of the tangential bevels 79 can alternatively also be described as chamfering of an edge of a radial outer surface of the latching lug 74. It is essential for the function explained in detail above that the three bevels 76, 77, 79, which form the respective functional surfaces for releasing a very specific movement are located in a common corner region of the latching lug 74. The second latching means 72 is bordered on the two sides by engagement edges 71, 73. The different bevels 76, 77, 79 serve to guide the latching means 72 in different mounting steps, namely when the filter element 10 is inserted in the lid 110 and when the filter element 10 is removed from the lid 110 as well as when the lid 110 with filter element 10 is inserted into a housing part and when the lid 110 with filter 10 is removed from the housing part.

Figure 7:
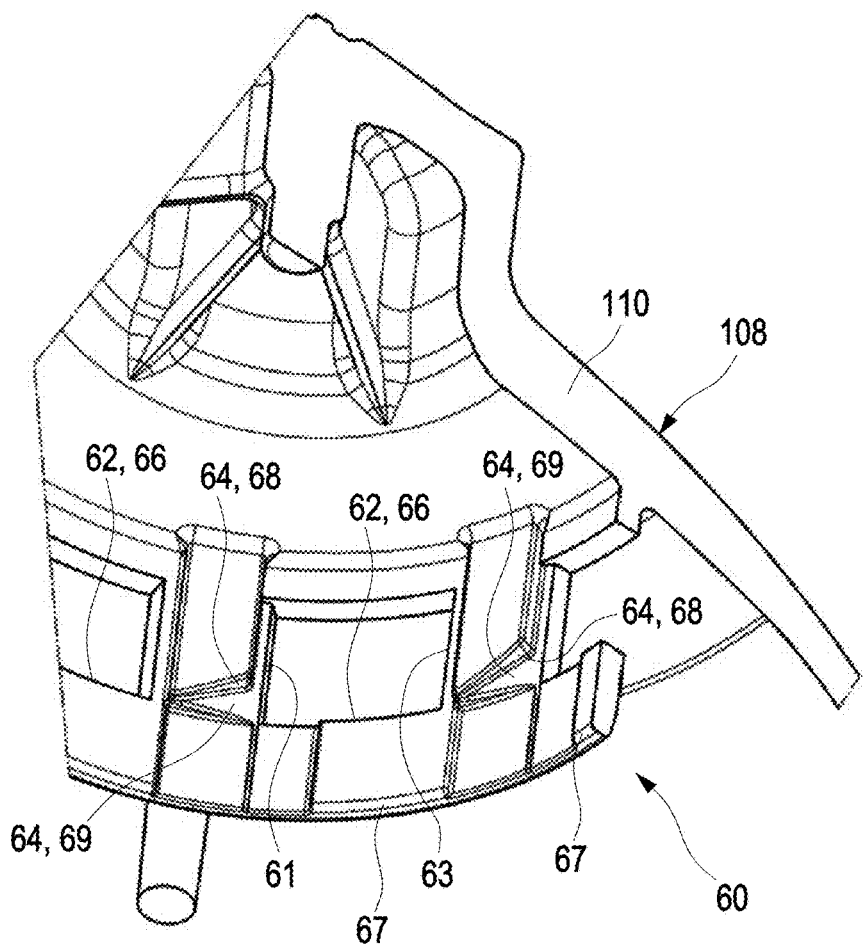
FIG. 7 an isometric, partial sectional interior view of the lid of the filter system according to FIG. 3, which shows first coupling parts.

FIG. 7 shows an isometric, partial sectional interior view of the lid 110 of the filter system 100 according to FIG. 3, which shows the first coupling part 60. The first coupling part 60 has first latching means 62, which are designed in the form of openings 66. Further, the first latching means 62 have control surfaces 64 for the purpose of engaging with the second latching means 72. The control surfaces 64 thereby each comprise one axially oriented bevel 68 as well as one tangentially oriented bevel 69. Projections 67 can further be recognized in FIG. 7 that connect to the latching means 62 and are provided for the purpose of engaging with the first axial bevels 76 of the second latching means 72. The openings 66 of the first latching means 62 have engagement edges 61, 63 running axially.

In the following FIGS. 8 to 15, the cooperation of the coupling parts 60, 70 of the coupling device 50 are illustrated wherein lid 110 and filter element 10 are joined, as well as when lid 110 and filter element 10 are released.

Figure 8:
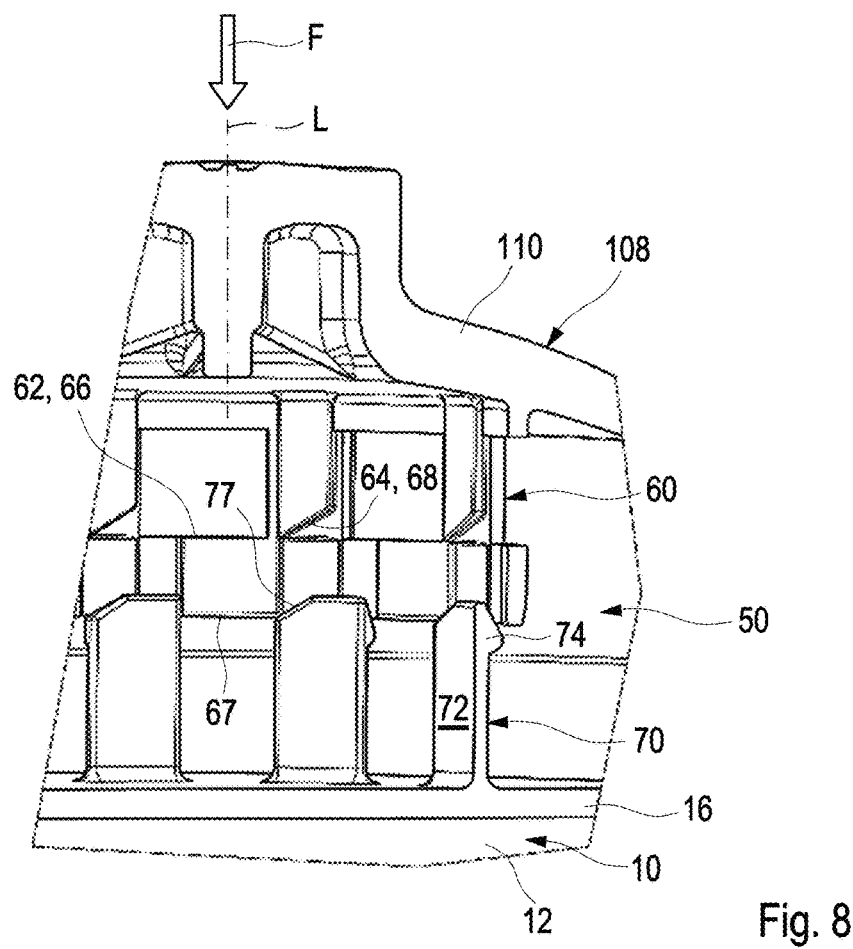
FIG. 8 a section of an isometric, partial sectional interior view of the lid of the filter system according to FIG. 3 when the lid is placed on the filter element.
Figure 9:
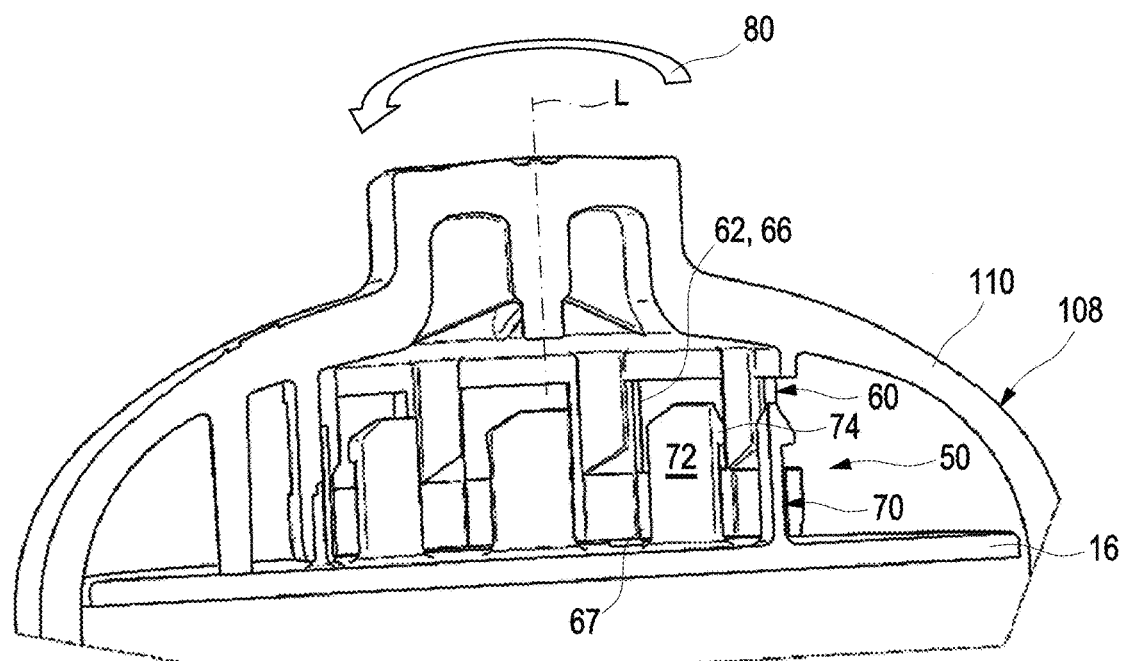
FIG. 9 an isometric, partial sectional view of the filter system according to FIG. 3 after the insertion of the filter element into the lid having a filter element fixed therein in end position.

FIG. 8 shows a section of an isometric, partial sectional view of the filter system 100 according to FIG. 3 when the lid 110 is placed on the filter element 10. The lid 110 is pushed in the axial direction along the longitudinal axis L, indicated by the force F, onto the filter element 10, wherein the second latching means 72 can slide between the projections 67 of the first coupling part 60 in the axial direction. As lid 110 is lowered further onto the filter element 10, the lateral axial bevel 77 of the second latching means 72 contacts the axial bevels 68 of the first latching means 62. With lid 110 rotating in the counter-clockwise direction 80 around the longitudinal axis L and simultaneous further lowering of the lid 110 onto the filter element 10, as illustrated in FIG. 9, the second latching means 72 are thereby pressed radially inward, so that the second latching means 72 can slide into the opening 66 of the first latching means 62, where they snap radially back toward the outside and come into engagement between the latching lugs 74 and the openings 66, because the latching lugs 74 now engage the projections 67. The filter element 10 is thus connected to the lid 110 and can be inserted with the lid 110, for example into a first housing part (not depicted) of the filter system 100.

Figure 10:
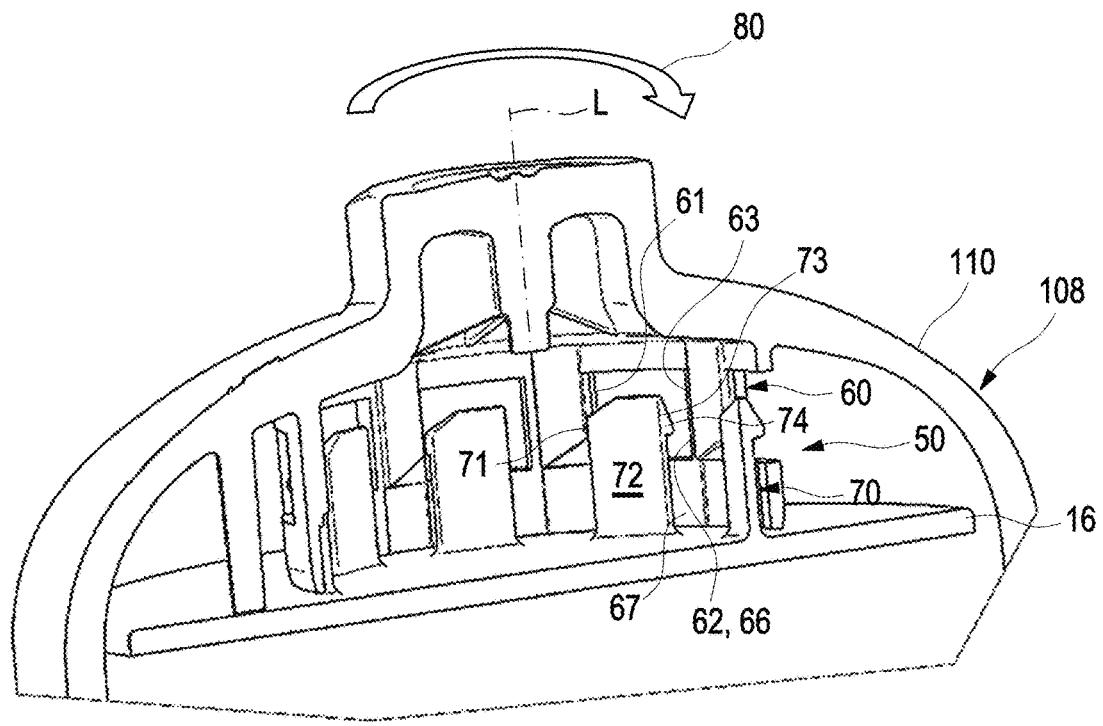
FIG. 10 the filter system according to FIG. 3 when the filter housing is screwed to the lid with an inserted filter element.

If the filter element 10 is inserted with the lid 110 into the first housing part, the filter housing 108 can be screwed on using the screw thread 112 (see FIG. 3) by the lid 110 being rotated around the longitudinal axis L in clockwise direction 80. The filter element 10 is thereby rotated along with the lid 110 because the filter element 10 is engaged with the first latching means 62 of the lid 110 via the second latching means 72. The engagement edges 71 of the second latching means 72 thus come to rest against the engagement edges 61 of the first latching means 62, as illustrated in FIG. 10, so that the filter element 10 is turned with it. The projections 78 of the latching lugs 74 thus move away from the radial projections 67 of the first coupling part 60 in the axial direction because the lid 110 is lowered further onto the filter element 10.

Figure 11:
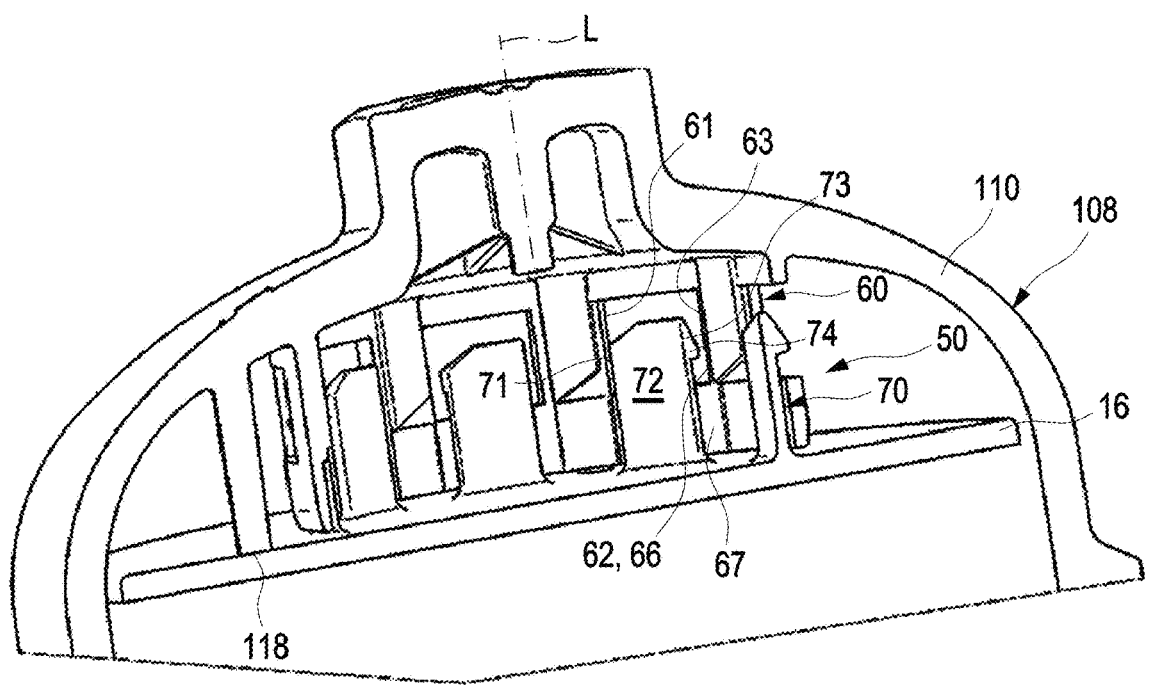
FIG. 11 the filter system according to FIG. 3 having an inserted filter element and screwed-on filter housing in end position.

Illustrated in FIG. 11 is the filter system 100 with inserted filter element 10 and screwed-on filter housing 108. The filter element 10 is immersed far enough into the lid 110 that it rests with its end plate 16 against the stop 118 of the lid 110.

Figure 12:
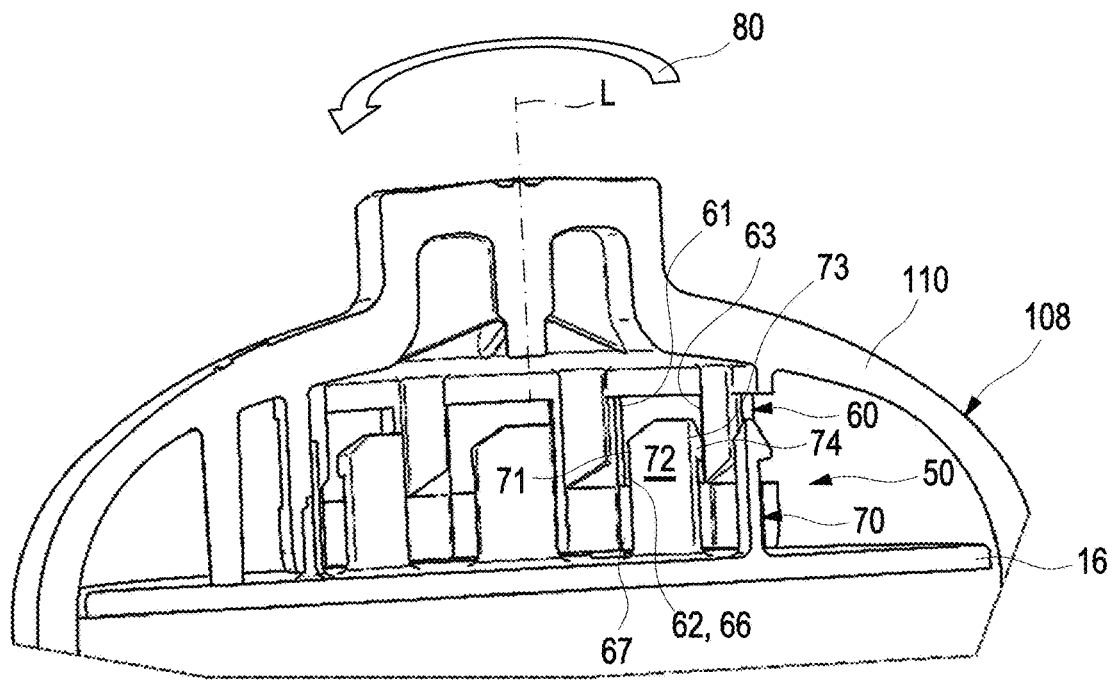
FIG. 12 the filter system according to FIG. 3 with an inserted filter element when the filter housing is opened for removal of the filter element with lid.

When the lid 110 is released from the first housing part, for example in order to replace the filter element 10, the lid 110 is rotated in a counter-clockwise direction 80 around the longitudinal axis L, as shown in FIG. 12. This causes the engagement edges 73 of the second latching means 72 to rest against the engagement edges 63 of the first latching means 62, and the filter element 10 is co-rotated when the lid 110 is further rotated.

Figure 13:
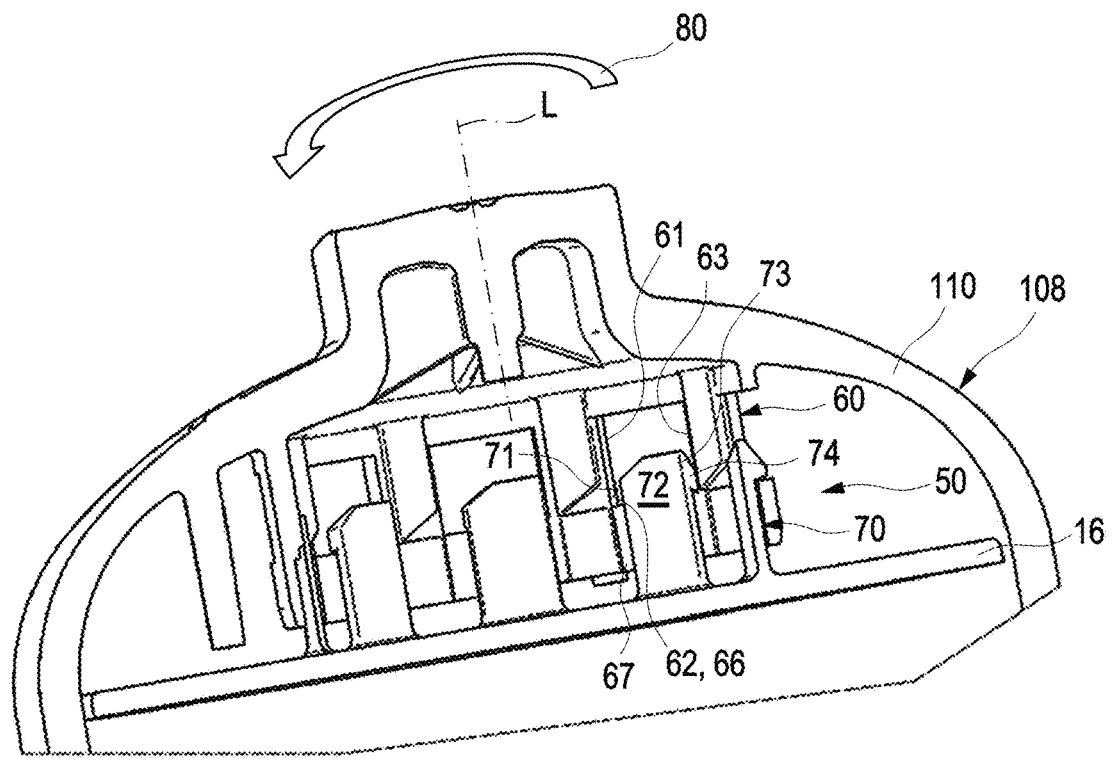
FIG. 13 the filter system according to FIG. 3 upon further loosening of the lid with filter element from the filter housing.

As the screw connection of the lid 110 is further loosened, the lid 110 is lifted off of the filter element in the axial direction so that the latching lugs 74 of the second latching means 72 come to rest against the radial projections 67 of the openings 66, as illustrated in FIG. 13. In this manner, the filter element 10 with the lid 110 can be lifted out of the first housing part when lid 110 is released.

When the lid 110 is released from the filter element 10, the lid 110 is then rotated again around the longitudinal axis L in clockwise direction 80, so that the lateral axial bevels 77 of the second latching means 72 come to rest against the axial bevels 68 of the first latching means 62. The tangential bevels 79 of the second latching means 72 not visible in FIG. 14 thus first come into contact with the tangential bevels 69 of the first latching means 62, which presses the second latching means 72 radially inward when the lid 110 is further rotated and the engagement of the second latching means 72 is released from the first latching means 62. At the same time, the lid 110 is pushed upward in the axial direction by the axial bevels 68, 76, 77 so that the lid can then be removed from the filter element 10, as illustrated in FIG. 15. The second latching means 72 thus slide downward between the radial projections 67 of the first coupling part 60 so that the filter element 10 is released from the lid 110.

What is claimed is:

1. A filter system for filtering a fluid, comprising:
   at least one filter element;
   a filter housing having
     at least one first housing part; and
     a second housing part forming a lid of the filter housing;
   a coupling device, comprising
     at least one first coupling part; and
     at least one second coupling part configured to engage and removably couple the at least one filter element to the second housing part;
   wherein the first coupling part comprises
     at least one first latching member and control surfaces;
   wherein the at least one second coupling part comprises
     at least one second latching member configured to operatively connect to respective ones of the at least one first latching member and control surfaces;
   wherein the at least the first latching member and the at least one second latching member are configured to functionally connect to each other when joined and the control surfaces and the at least one second latching member are brought into operative connection when released from the second housing part and filter element;
   wherein the at least one second latching member each have three bevels;
   wherein at least two of the bevels cooperate with the control surfaces to release the second housing part from the filter element upon a relative rotation of the filter element around a longitudinal axis counter to the second housing part;
   wherein the bevels each comprise
     at least one axially oriented axial bevel pointing in radial direction, one axially oriented lateral axial bevel pointing in circumferential direction and a tangentially oriented tangential bevel, and
   wherein, in the relative rotation of the filter element around the longitudinal axis (L) counter to the second housing part by the cooperation of the tangential bevels with the control surfaces of the first coupling part, a disengaging deformation of the at least one second latching member in the radial direction and, by means of the cooperation of the lateral axial bevels with the control surfaces, a release movement in the axial direction can be achieved.

2. The filter system according to claim 1, wherein the second latching member comprises latching lugs.

3. The filter system according to claim 2, wherein the axial bevel, the lateral axial bevel and the tangential bevel pointing in radial direction are available in a corner region of the latching lug.

4. The filter system according to claim 1, wherein the first latching member and the second latching member are configured such that, by a relative axial movement from the second housing part and filter element in the mounting direction, the second latching member can be latched to the first latching member, wherein the axial bevels in conjunction with the control surfaces of the first latching member effect a latching deformation of the second latching member in the radial direction.

5. The filter system according to claim 1, wherein
   the first coupling part is arranged on the second housing part; and
   the second coupling part is arranged on the filter element; or
   wherein the first coupling part is arranged on filter element; and
   the second coupling part is arranged on the second housing part.

6. The filter system according to claim 1, wherein
   the coupling device is arranged on an outside of regions with mechanical clamping points of the second housing part.

7. The filter system according to claim 1, wherein
   the control surfaces include
     at least one axially oriented bevel; and
     at least one tangentially oriented bevel.

8. The filter system according to any of claim 1, wherein
   the axially oriented axial bevel pointing in radial direction and the axially oriented lateral axial bevel pointing in a circumferential direction are inclined at an angle of at least 90 degrees to one another.

9. The filter system according to claim 1, wherein
   the first latching member includes openings and/or recesses.

10. The filter system according to claim 1, wherein
    the first coupling part is formed as a sleeve-shaped section;
    wherein the first latching member is arranged in a wall of the sleeve-shaped section;
    wherein the first latching member is embodied as windows penetrating the wall, or as recesses that do not penetrate the wall.

11. The filter system according to claim 2, wherein
    the second coupling element is arranged in the radial direction inside the first coupling element;
    wherein the latching lugs are arranged pointing radially outward.

12. The filter system according to any of claim 2, wherein
    the filter element can be inserted and extracted together in unison with the second housing part along a longitudinal axis (L) in the filter housing when the latching members are engaged and latched.

13. A filter element for installation in a filter system according to any of claim 1, comprising:
    at least one end plate arranged on an end face of a filter bellows of a filter medium and a coupling part; and configured to engage with a corresponding, housing-side coupling part of a coupling device;
    wherein the coupling part of the filter element has one or a plurality of latching members;
    wherein the latching members comprise
      bevels, which are formed to effect a release of the housing part from the filter element when there is a relative rotation of the filter element around its longitudinal axis (L) counter to a housing part;
    wherein the bevels comprise
      at least one axially oriented axial bevel pointing in radial direction;
      one axially oriented lateral axial bevel pointing in circumferential direction; and one tangentially oriented tangential bevel;
wherein a loosening deformation of the latching member in radial direction can first be effected via the tangential bevel and a disengaging movement in axial direction can be effected via the lateral axial bevels.

14. The filter system according to claim 13, wherein the latching member comprises
latching lugs.

15. The filter system according to claim 13, wherein the axial bevel, the lateral axial bevel and the tangential bevel pointing in radial direction are available in a corner region of the latching lug.

* * * * *